US 8,944,678 B2

(12) United States Patent
Snider et al.

(10) Patent No.: US 8,944,678 B2
(45) Date of Patent: Feb. 3, 2015

(54) INSTRUMENTATION RAKE ASSEMBLY (75) Inventors: Zachary John Snider, Simpsonville, SC (US); Sylvain Pierre, Greer, SC (US); Kurt Kramer Schleif, Greenville, SC (US)

(73) Assignee: General Electric Company, Schenectady, NY (US)

( * ) Notice: Subject to any disclaimer, the term of this patent is extended or adjusted under 35 U.S.C. 154(b) by 58 days.

(21) Appl. No.: 13/107,207

(22) Filed: May 13, 2011

(65) Prior Publication Data

US 2012/0285237 A1    Nov. 15, 2012

(51) Int. Cl.
| | |
|---|---|
| *G01K 3/00* | (2006.01) |
| *G01K 7/00* | (2006.01) |
| *G01K 1/00* | (2006.01) |
| *G01K 13/02* | (2006.01) |
| *G01K 1/12* | (2006.01) |
| *G01L 19/14* | (2006.01) |
| *G01L 23/26* | (2006.01) |

(52) U.S. Cl.
CPC ...... *G01K 13/02* (2013.01); *G01K 1/12* (2013.01); *G01L 19/149* (2013.01); *G01L 23/26* (2013.01); *G01K 2205/04* (2013.01)
USPC ........... 374/116; 374/179; 374/208; 374/166; 374/148; 374/137

(58) Field of Classification Search
USPC ......... 374/115, 148, 111, 112, 113, 116, 138, 374/179, 166, 208, 137; 136/231
See application file for complete search history.

(56) References Cited

U.S. PATENT DOCUMENTS

| | | | | |
|---|---|---|---|---|
| 2,835,718 | A | * | 5/1958 | Stickney et al. ............. 136/231 |
| 3,393,101 | A | * | 7/1968 | Kirkpatrick ................. 136/224 |
| 3,605,495 | A | * | 9/1971 | Krause et al. ................ 374/138 |
| 4,747,700 | A | * | 5/1988 | Lenz et al. .................... 374/135 |
| 4,903,481 | A | | 2/1990 | Schuster et al. |
| 5,433,114 | A | * | 7/1995 | Cook et al. ....................... 73/756 |
| 7,377,687 | B2 | | 5/2008 | Chana |
| 2002/0122459 | A1 | | 9/2002 | McFarland et al. |
| 2007/0153870 | A1 | * | 7/2007 | Miliani et al. ................ 374/116 |
| 2010/0158074 | A1 | * | 6/2010 | Fortier et al. ................. 374/208 |
| 2011/0232379 | A1 | * | 9/2011 | Snider ......................... 73/272 R |
| 2012/0167695 | A1 | * | 7/2012 | Snider ............................ 73/778 |

FOREIGN PATENT DOCUMENTS

| | | |
|---|---|---|
| DE | 102008025869 A1 | 12/2009 |
| GB | 2452026 A | 2/2009 |
| KR | 20020016094 A | 3/2002 |

OTHER PUBLICATIONS

Extended European Search Report for Application No. 12167783.5 dated Feb. 26, 2014; 8 pages.

* cited by examiner

*Primary Examiner* — Mirellys Jagan
(74) *Attorney, Agent, or Firm* — Cantor Colburn LLP (57) ABSTRACT

An instrumentation rake assembly comprises a rake tower capped at an immersed end and mated to a lead carrier at a base end. The rake tower comprises a curved wall oriented along a longitudinal axis and supporting a plurality of probe holders. The curved wall has an inner surface defining an internal passage for carrying instrumentation from the probe holders to the lead carrier. In another aspect, an instrumentation rake assembly comprises a plurality of rake towers, each having a base end and an immersed end, and each rake tower being coupled at its immersed end to one or more other rake towers.

19 Claims, 6 Drawing Sheets

INSTRUMENTATION RAKE ASSEMBLY

BACKGROUND OF THE INVENTION

The subject matter disclosed herein relates generally to high temperature instrumentation assemblies and, more specifically, to a probe-holding rake structure of machined ceramic material for acquiring measurements in high temperature environments in gas turbine engines and the like.

Instrumentation rake assemblies are used to measure temperatures and pressures in many applications such as within a turbine engine. Typically, instrumentation rakes are configured and positioned to traverse a region of interest, and that region may be in an extremely harsh environment, such as at the exit of a combustor or another location within an engine. To traverse a region of interest, an instrumentation rake assembly may include a number of probes arranged at varying distances along the rake.

Where a probe is intended to measure temperature, the probe may comprise a thermocouple of two dissimilar metals joined at one end. The dissimilar metals of the thermocouple produce a voltage that varies with temperature, and analysis of the voltage can be used to determine sensed temperature. Where the probe is intended to measure pressure, the probe may comprise means such as a tube to enable gas from the sensed region to act upon a strain gage or other apparatus, whereby the apparatus may produce a signal indicative of the sensed pressure.

In both cases, means are necessary for transmitting the signal to a location where it can be recorded and/or analyzed. Where the signal is a voltage, a conductor is necessary to transmit the voltage. Where the signal is a volume of pressurized gas, a tube or other structure is required to enable the pressurized gas (or another intermediate fluid) to act upon the strain gage. Accordingly, instrumentation rake assemblies serve not only to position a number of probes at desired locations within the environment to be sensed, but also to provide means for carrying the signal produced by the probes to one or more locations outside the sensed environment.

While it is often desirable to reduce the impact of an instrumentation rake assembly on the environment intended to be sensed, it is also necessary for the rake assembly to withstand that environment. If that environment is extremely hot, such as in the wake of a combustor or turbine in a gas turbine, the rake assembly must be able to withstand extremely high heat. If that environment entails extreme vibration, high impingement forces, and cyclic variations thereof, a rake assembly must be able to withstand those challenges as well. Otherwise, the rake assembly may fail, causing not only loss of the hosted instrumentation, but also possible damage to downstream components.

Previous attempts to improve the durability of instrumentation rake assemblies in high-temperature environments have employed cooling techniques. Unfortunately, to facilitate cooling of a rake assembly requires cooling passageways within the assembly, thereby increasing the size and complexity of the rake assembly and its disruption of the sensed environment. Moreover, in a gas turbine engine, the pressurized airflow needed to cool a rake assembly in a high-pressure environment, such as in the wake of a combustor or turbine, can be highly parasitic to the thermal efficiency or power output capability of the engine.

Therefore, there is a desire for an instrumentation rake assembly that can enable the instrumentation to withstand increased temperatures and vibrations with reduced cooling and without failure.

BRIEF DESCRIPTION OF THE INVENTION

According to one aspect of the invention, an instrumentation rake assembly comprises a rake tower having a base end and an immersed end, the rake tower being capped at the immersed end and mated to a lead carrier at the base end. In accordance with the invention, the rake tower comprises a curved wall oriented along a longitudinal axis and supporting a plurality of probe holders. The curved wall has an inner surface that defines an internal passage for carrying instrumentation from the probe holders to the lead carrier.

According to another aspect of the invention, an instrumentation rake assembly comprises a plurality of rake towers, each having a base end and an immersed end, and each rake tower being coupled at its immersed end to one or more other rake towers. In accordance with this aspect, each rake tower is mated to a lead carrier at the base end of that rake tower, and each rake tower comprises a curved wall oriented along a respective longitudinal axis and supporting a plurality of probe holders, wherein the curved wall of each rake tower defines an internal passage for carrying instrumentation from the plurality of probe holders to the lead carrier.

Thus, the invention provides an instrumentation rake assembly that can enable the instrumentation to withstand increased temperatures and vibrations with reduced cooling and without failure.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
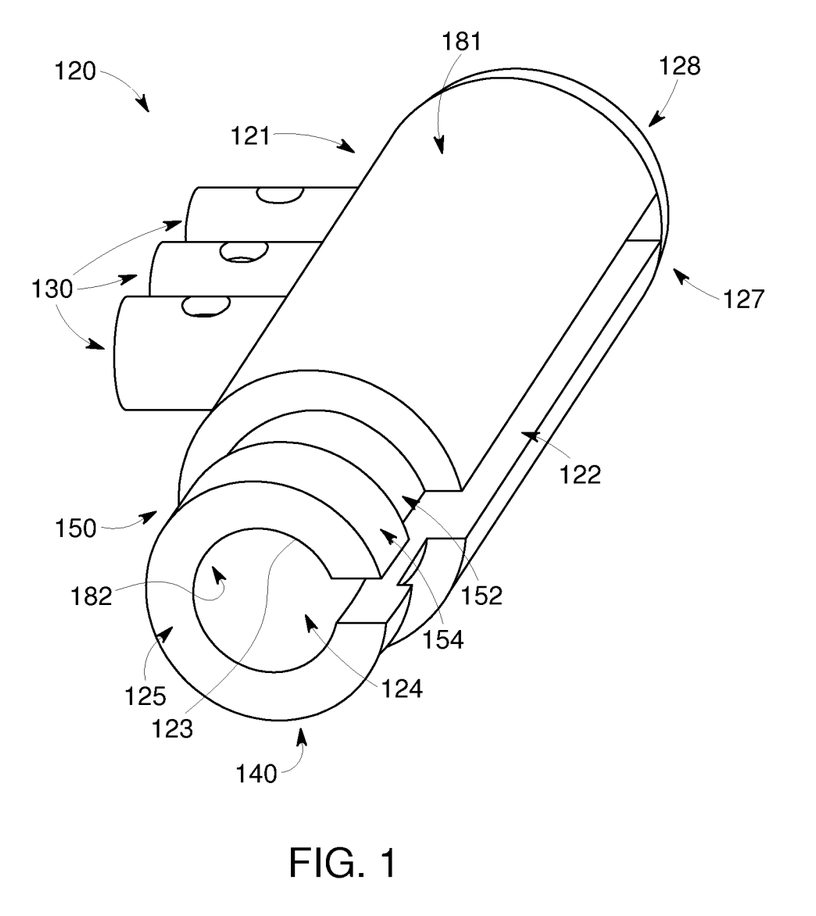
FIG. 1 is an isometric drawing of an exemplary rake tower as is described herein.

Referring now to the drawings, in which like numerals refer to like elements throughout the several views, FIG. 1 shows an exemplary rake tower 120 as described herein. In use, rake tower 120 extends into the flow path of a gas turbine engine for measuring gas parameters of interest such as temperature or pressure in locations such as near the middle of a passage and/or near a wall of the flow path. Rake tower 120 comprises a wall 125 with a dome-shaped cap 128 sealing an immersed end of cylindrical wall 125 and with an apposing base end 140 that remains open and uncapped. Wall 125 has an outer surface 181 and an inner surface 182, and wall 125 is curved such that the inner surface 182 defines an internal passage 124 oriented along a longitudinal axis 123. While the cross-sectional shape of wall 125 is depicted in FIG. 1 as being circular, such that wall 125 is cylindrical in shape, it should be appreciated that other elongated or eccentric cross-sectional shapes, such as ellipsoid or tear-drop, are possible and may be desirable in certain applications where the interaction of the outer surface 181 of wall 125 and the stream of flow are to be considered. Exemplary considerations include interference with the stream of flow caused by the immersed rake assembly, aerodynamic drag forces impinging on the immersed rake assembly, heat transfer effects, erosion, mechanical interferences, structural strength of the rake assembly, and blocking of the flow path. In such cases, elongation of the cross-section may be oriented with the stream of flow or in other directions as design considerations may demand.

In an exemplary embodiment, immersed end of wall 125 extends across an entire flow path such that rake tower 120 does not include a dome-shaped cap 128, but is instead coupled to another rake tower extending from an apposing wall of the flow path.

Wall 125 supports a plurality (e.g., three) of instrumentation probe holders 130 distributed along an instrumentation side 121 of wall 125. Internal passage 124 facilitates carrying instrumentation leads from instrumentation probes that are housed within the instrumentation probe holders 130. Instrumentation probe holders 130 are configured to house individual probes so as to provide structural support and protection for individual probes, thereby enabling them to survive in high temperature regions without cooling. Accordingly, each probe holder defines a receptacle for receiving an instrumentation probe. Each probe holder 130 may include a shroud-like inlet (e.g., as in a kiel probe) to reduce sensitivity to changes in the orientation of the receptacle relative to the direction of the flow in the flow path. Instrumentation probe holders 130 are also configured and shaped so as to cooperate with installed probes 112 so as to seal receptacle 132, thereby reducing infiltration of the sensed environment into internal passage 124.

In this embodiment, instrumentation probe holders 130 are all oriented in parallel along instrumentation side 121 of rake tower 120, perpendicular to the longitudinal axis 123. It should be understood, however, that instrumentation probe holders 130 may be distributed in various orientations depending upon the nature of the region that is to be sensed and into which rake tower 120 is to be immersed. Cylindrical wall 125 of rake tower 120 defines a lengthwise gap 122 that is oriented substantially parallel to longitudinal axis 123 and extends along an access side 127 of rake tower 120 from cap 128 to base end 140. Access side 127 substantially opposes instrumentation side 121 so that lengthwise gap 122 is positioned to provide access to internal passage 124 and to instrumentation probe holders 130 through internal passage 124. As will become evident from the remaining figures, lengthwise gap 122 and internal passage 124 facilitate assembly of instrumentation, including probes and leads, into rake tower 120. As seen in FIG. 1, in an exemplary embodiment, rake tower 120 also includes a retainer section that comprises a retainer groove 152 and retainer shoulder 154 for mating with a cooperating apparatus.

Rake tower 120 is constructed of a material suitable for the environment in which it is to be operated. To withstand immersion into the gas path of a gas turbine engine, rake tower 120 is adapted to withstand high-temperatures (i.e., temperatures between approximately 2000 degrees F. and approximately 3600 degrees F.) and high-speed (i.e., Mach numbers between about 0.3 and 0.95) gas flow. Accordingly, rake tower 120 is constructed of materials that can withstand high temperatures without oxidizing or losing structural integrity or eroding. Rake tower 120 may be constructed of material that conducts electricity. For installation into, and operation within, the highest temperature regions of a gas turbine engine, rake tower 120 may be constructed from a ceramic material such as titanium dioboride or another material providing a relatively high melting point, strength, hardness, and resistance to oxidation. Titanium dioboride is an extremely hard ceramic material composed of titanium and boron and having excellent resistance to mechanical erosion. Titanium dioboride is also electrically conductive, providing for electromagnetic shielding of instrumentation leads and electrical grounding of rake tower 120.

Rake tower 120 may be formed as a single piece or machined from a larger single piece of material. In addition, rake tower 120 is shaped with smoothed edges and corners so as to reduce disruption to the flow path and to reduce losses in total pressure and the formation of turbulence or wakes that could adversely impact performance of downstream components.

Figure 2:
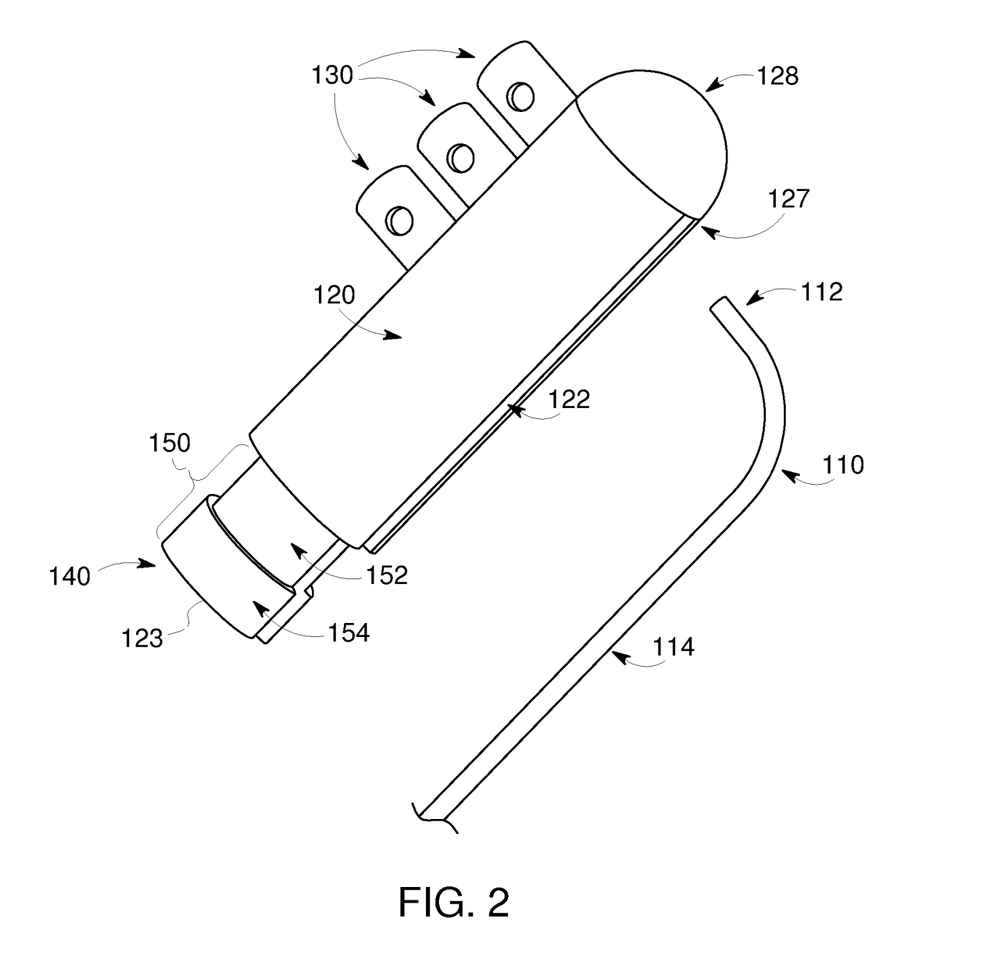
FIG. 2 is an isometric drawing of an exemplary rake tower and complementary instrumentation element as described herein.

As can be seen in FIG. 2, which depicts an exemplary rake tower 120 and complementary instrumentation element 110 as described herein, lengthwise gap 122 facilitates assembly of instrumentation element 110, including its installed probe 112 and instrumentation lead 114, into rake tower 120. When assembled, installed probe 112 is nested into or imbedded within instrumentation probe holders 130, and instrumentation lead 114 passes within internal passage 124, continuing out of an open base end 140 adjacent the retainer section 150 of rake tower 120. To aid in assembly, instrumentation element 110 may be pre-bent so as to be easily inserted through lengthwise gap 122 with installed probe 112 nesting within receptacle 132 defined by instrumentation probe holders 130. Installed probes 112 may protrude from instrumentation probe holders 130 so as to be exposed to the gas whose temperature is to be measured. Installed probes 112 may be high temperature thermocouples or pressure sensing elements such as Pitot probes.

Figure 3:
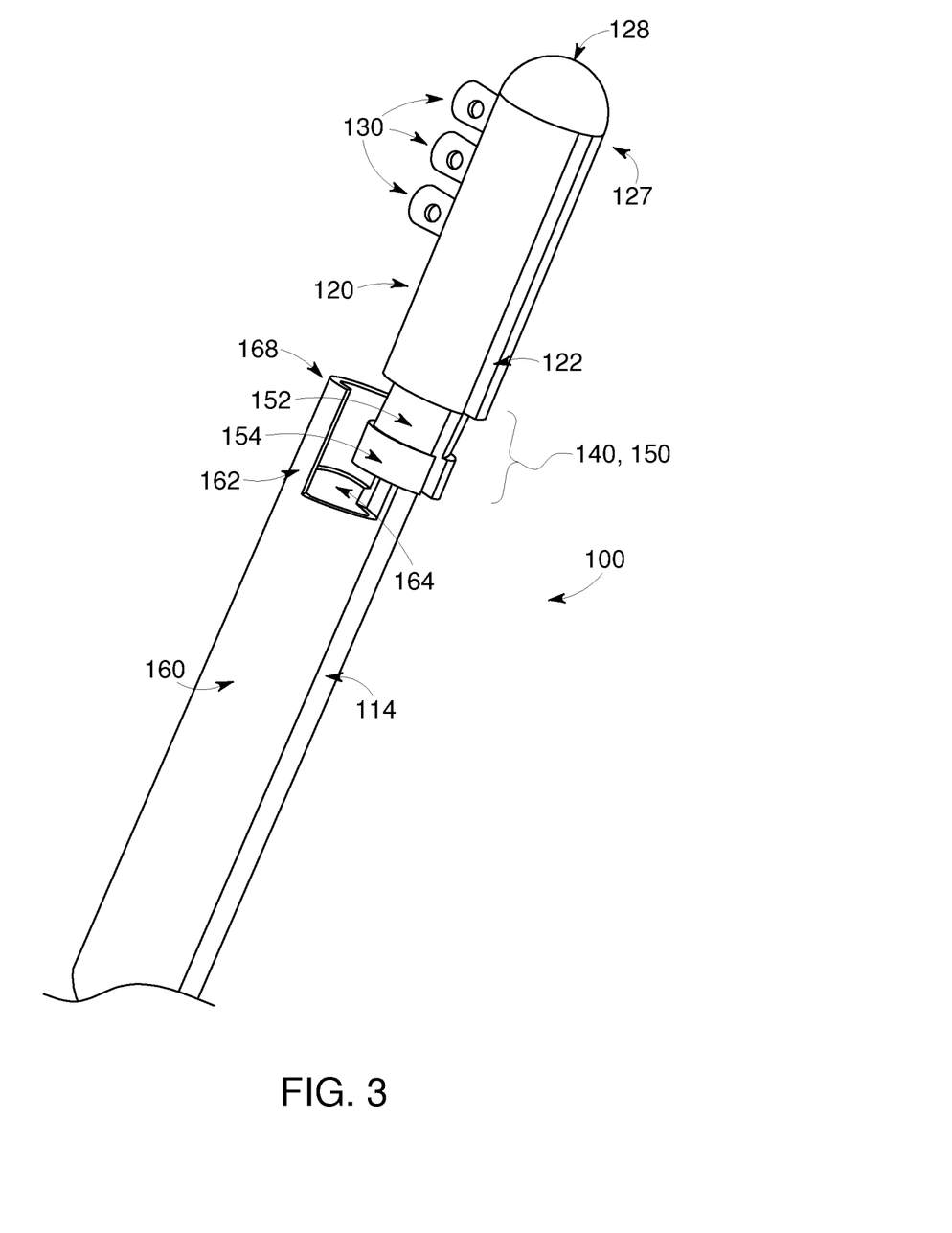
FIG. 3 is an isometric drawing of an exemplary rake tower and complementary lead carrier as described herein.

As shown in FIG. 3, a lead carrier 160 that is complementary to rake tower 120 provides a means for carrying and protecting instrumentation lead 114 away from rake tower 120 to a location where signals carried by instrumentation lead 114 can be recorded and/or analyzed and/or communicated to a controller. Lead carrier 160 includes a carrier lock section 162 that is complementary to the retainer section 150 of rake tower 120. In this case, carrier lock section 162 defines a carrier groove 164 that cooperates with retainer shoulder 154 of rake tower 120 so as to join lead carrier 160 with rake tower 120 when properly mated. Carrier lock section 162 also includes a carrier lip 168 that cooperates with retainer groove 152 to improve sealing and structural integrity of un-cooled, or less-cooled, instrumentation rake assembly 100. It should be noted that, after instrumentation element 110 is installed into rake tower 120, and before lead carrier 160 is mated with rake tower 120 at base end 140, instrumentation lead 114 may be fed through lead carrier 160.

Figure 4:
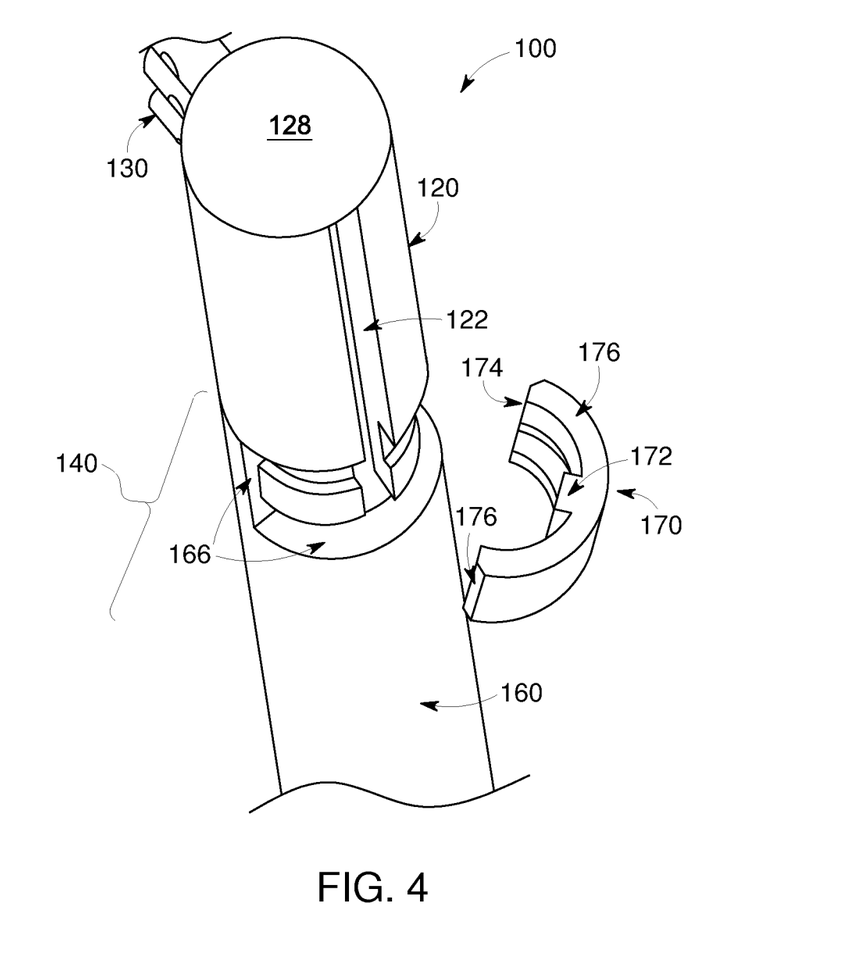
FIG. 4 is an isometric drawing of an exemplary rake assembly showing a rake tower mated with a complementary lead carrier and an unmated, complementary retainer clasp.

FIG. 4 shows an exemplary un-cooled instrumentation rake assembly 100 in nearly fully assembled state, wherein rake tower 120 is mated with a complementary lead carrier 160 and is ready to receive a complementary retainer clasp 170. As shown in FIG. 4, retainer clasp 170 includes a filler 172 to cooperate with lengthwise gap 122 of rake tower 120. Similarly, retainer clasp 170 has a groove filler 174 to cooperate with retainer groove 152 of rake tower 120. Bonding surfaces 176 of retainer clasp 170 are configured to cooperate with surfaces 166 of lead carrier 160. Both retainer clasp 170 and lead carrier 160 may be constructed of metal or another material suitable for bonding to one another, such as by welding. During assembly, it may be helpful to hold retainer clasp 170 in place with a temporary epoxy or other adhesive.

Figure 5:
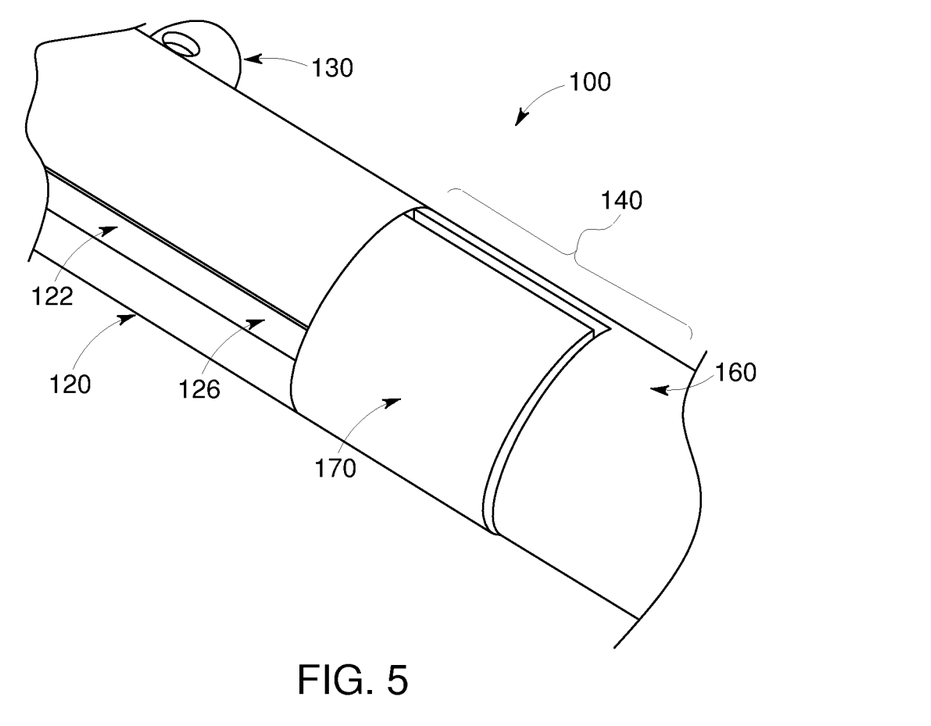
FIG. 5 is an isometric drawing of an exemplary rake assembly showing a rake tower mated with a complementary lead carrier and retainer clasp, and with the lengthwise gap in the rake tower containing a filler.

As shown in FIG. 5, an exemplary un-cooled instrumentation rake assembly 100 includes a rake tower 120 mated with a complementary lead carrier 160 and retainer clasp 170. Thus, rake tower 120 and lead carrier 160 are retained together with retainer clasp 170. In this embodiment, retainer clasp 170 is metal and is welded to lead carrier 160. A filler 126 seals lengthwise gap 122. Since the rake tower is to be immersed in the sensed environment, filler 126 should exhibit properties suitable for that environment. For example, filler 126 may be a high temperature ceramic potting.

Figure 6:
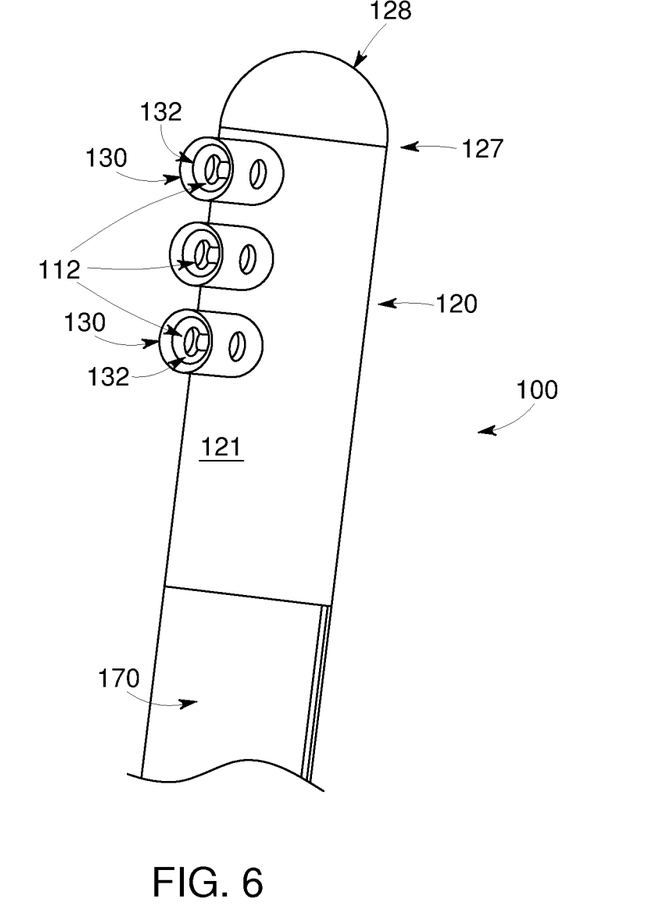
FIG. 6 is an isometric drawing of an exemplary rake assembly showing a rake tower mated with a complementary lead carrier and retainer clasp with instrumentation.

FIG. 6 shows a fully-assembled, un-cooled instrumentation rake assembly 100 comprising a rake tower 120 mated with a complementary lead carrier 160 and retainer clasp 170. As shown in FIG. 6, instrumentation probe holders 130 contain installed probes 112, which may comprise type k or b thermocouples.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An instrumentation rake assembly comprising:
a rake tower for immersion in a sensed environment, the rake tower having a base end and an immersed end, the rake tower being capped at the immersed end and mated, at the base end, to a lead carrier,
the rake tower comprising a curved wall oriented along, and curved around, a longitudinal axis of the rake assembly, the curved wall supporting a plurality of probe holders,
the lead carrier defining a lead carrier internal passage that is disposed within the lead carrier, that extends along the lead carrier, and that is disposed about the longitudinal axis of the rake assembly where the lead carrier is mated to the rake tower,
the curved wall of the rake tower being curved about the longitudinal axis of the rake assembly and having an inner surface that defines rake tower internal passage that extends along the longitudinal axis of the rake assembly from the immersed end of the rake tower through the base end of the rake tower, the rake tower internal passage being configured for carrying instrumentation within the rake tower internal passage and along the longitudinal axis of the rake assembly from the plurality of probe holders to the lead carrier internal passage, and
the internal passage of the rake tower and the lead carrier internal passage being sealed from the sensed environment wherein the rake tower is uncooled.

2. The instrumentation rake assembly of claim 1, wherein the rake tower comprises ceramic material.

3. The instrumentation rake assembly of claim 1, wherein the rake tower comprises titanium dioboride.

4. The instrumentation rake assembly of claim 1, wherein the lead carrier comprises an elongated metal tube configured for protecting the instrumentation while carrying the instrumentation within the elongated metal tube from the rake tower to a location remote from the rake tower.

5. The instrumentation rake assembly of claim 1, wherein the rake tower is capped at the immersed end with a dome-shaped cap.

6. The instrumentation rake assembly of claim 1, wherein the curved wall supports three probe holders.

7. The instrumentation rake assembly of claim 1, wherein the plurality of probe holders is oriented in parallel.

8. The instrumentation rake assembly of claim 1, wherein the plurality of probe holders is oriented perpendicularly to the longitudinal axis.

9. The instrumentation rake assembly of claim 1, wherein the plurality of probe holders includes a shroud-like inlet.

10. The instrumentation rake assembly of claim 1:
further comprising an instrumentation lead disposed along the longitudinal axis of the rake assembly within the rake tower internal passage and the lead carrier internal passage;
wherein the base end of the rake tower internal passage is open to the lead carrier internal passage, and the instrumentation lead passes out of the rake tower internal passage through the base end and into the lead carrier internal passage; and
wherein the lead carrier is disposed about the longitudinal axis of the rake assembly.

11. The instrumentation rake assembly of claim 1, wherein the curved wall defines a lengthwise gap positioned along an access side of the rake tower and oriented parallel to the longitudinal axis.

12. The instrumentation rake assembly of claim 11, wherein the lengthwise gap contains a ceramic filler.

13. The instrumentation rake assembly of claim 1, wherein the rake tower and the lead carrier are retained together with a clasp.

14. The instrumentation rake assembly of claim 13, wherein the clasp is metal and is welded to the lead carrier.

15. The instrumentation rake assembly of claim 1, wherein each probe holder of the plurality of probe holders defines a receptacle for receiving an instrumentation probe.

16. The instrumentation rake assembly of claim 15, wherein each probe holder of the plurality of probe holders is configured to cooperate with an instrumentation probe so as to reduce infiltration of the sensed environment into the internal passage.

17. The instrumentation rake assembly of claim 15, wherein the instrumentation probe is a thermocouple.

18. The instrumentation rake assembly of claim 15, wherein the instrumentation probe is a Pitot probe.

19. An instrumentation rake assembly comprising:
a rake tower for immersion in a sensed environment, the rake tower having a base end and an immersed end;
the rake tower being capped at the immersed end and mated at its base end to a lead carrier;
the lead carrier defining a lead carrier internal passage that is disposed within the lead carrier, that extends along the lead carrier, and that is disposed about a longitudinal axis of the rake assembly where the lead carrier is mated to the rake tower;

the rake tower comprising a curved wall oriented along the longitudinal axis of the rake assembly, the curved wall supporting a plurality of probe holders, the curved wall being curved around the longitudinal axis of the rake assembly and defining rake tower internal passage that is uncooled and extends along the longitudinal axis of the rake assembly from the immersed end of the rake tower through the base end of the rake tower, the rake tower internal passage being configured for carrying instrumentation within the rake tower internal passage and along the longitudinal axis from the plurality of probe holders to the lead carrier internal passage;

wherein the rake tower internal passage is sealed from the sensed environment;

wherein the lead carrier internal passage is sealed from the sensed environment;

wherein the rake tower comprises ceramic material;

wherein the lead carrier comprises metal; and wherein the rake tower and the lead carrier are retained together with a metal clasp.

* * * * *

UNITED STATES PATENT AND TRADEMARK OFFICE
CERTIFICATE OF CORRECTION

| | | |
|---|---|---|
| PATENT NO. | : 8,944,678 B2 | Page 1 of 1 |
| APPLICATION NO. | : 13/107207 | |
| DATED | : February 3, 2015 | |
| INVENTOR(S) | : Snider et al. | |

It is certified that error appears in the above-identified patent and that said Letters Patent is hereby corrected as shown below:

In the claims

In Column 5, Lines 50-51, in Claim 1, delete "holders," and insert -- holders, wherein the rake tower is formed of a ceramic material, --, therefor.

In Column 5, Lines 59-60, in Claim 1, delete "defines rake tower internal passage that extends" and insert -- defines a rake tower internal passage that is uncooled and extends --, therefor.

In Column 7, Line 8, in Claim 19, delete "defining rake" and insert -- defining a rake --, therefor.

Signed and Sealed this
First Day of December, 2015

Michelle K. Lee
*Director of the United States Patent and Trademark Office*